(No Model.)

C. L. CLARKE.
GALVANIC BATTERY.

No. 298,175. Patented May 6, 1884.

UNITED STATES PATENT OFFICE.

CHARLES L. CLARKE, OF MANCHESTER, COUNTY OF LANCASTER, ENGLAND, ASSIGNOR TO THE DOMESTIC ELECTRICAL MANUFACTURING COMPANY, OF BOSTON, MASSACHUSETTS.

GALVANIC BATTERY.

SPECIFICATION forming part of Letters Patent No. 298,175, dated May 6, 1884.

Application filed November 16, 1883. (No model.)

*To all whom it may concern:*

Be it known that I, CHARLES LEIGH CLARKE, a subject of the Queen of Great Britain, and residing at Manchester, county of Lancaster, England, have invented Improvements in Galvanic Batteries, of which the following is a specification.

My invention relates to improvements in galvanic batteries used for telephones and various other purposes where a weak current only is required, the object being to economize the cost and to reduce the size thereof, and consequently the space required for a battery of this description.

The invention consists, principally, in the use of an oxide of mercury (either alone or mixed with powdered or granulated carbon) as the depolarizing agent in a galvanic cell, in combination with an exciting-fluid composed of potassic or sodic hydrate dissolved in water.

Figure 1:
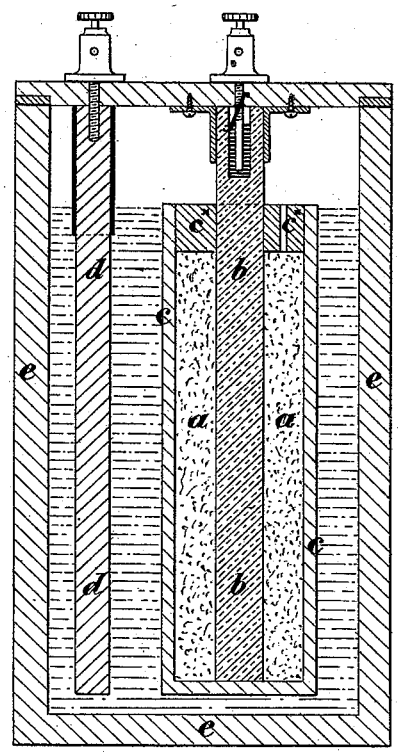
Figure 2:
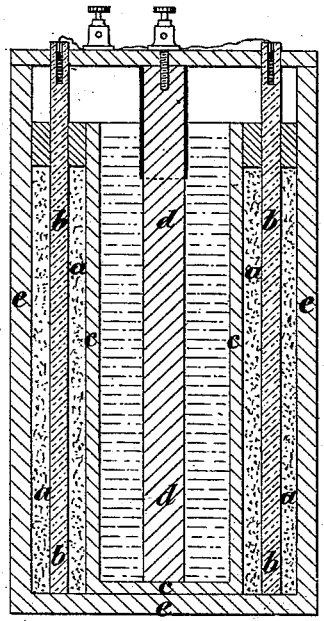

The manner of carrying my invention into practical effect will be readily understood on reference to the accompanying drawings and the following description or explanation thereof—that is to say:

Figure 1 on the annexed drawings is a vertical section of a single-cell galvanic battery made according to my invention, and Fig. 2 is a similar view of a slight modification of the same.

In carrying my invention into practice I take a quantity of mercuric or mercurous oxide, $a\,a$, Fig. 1, (either alone or mixed with carbon in the form of powder or granules,) and I pack it around a carbon rod, $b\,b$, or around a carbon plate in a porous cell, $c\,c$, the mouth being closed with cement $c^\times c^\times$, the mercury oxide being the depolarizing agent and the carbon being the negative electrode. If a single carbon rod be employed, as shown at Fig. 1, it may with advantage be fluted, so as to increase its surface. The positive electrode may be a zinc rod, $d\,d$, or a plate placed outside the porous cell $c\,c$; or it may be a zinc cylinder surrounding it. The exciting-fluid is a solution of potassic or sodic hydrate of suitable strength, and is placed in the outer cell, $e\,e$. It will be evident that this arrangement may be varied when preferred—for instance, see Fig. 2, wherein two carbon rods, $b\,b$, packed with the depolarizing agent $a\,a$, are placed outside the porous cell $c\,c$, and the zinc rod $d\,d$ inside the latter, in which the exciting-fluid is also placed.

I prefer to make the connection to the negative electrode $b\,b$ by drilling a hole in the carbon and pouring in mercury, into which the lower end of a binding-screw may dip, as shown at $f\,f$, Fig. 1, the precaution being taken of having this part of the screw made of copper or iron, so that the mercury will not destroy it. In Fig. 2 the ends of the wires are shown as dipping into the mercury in the holes formed in the upper ends of the carbon rods $b\,b$.

I do not wish to claim, broadly, combining potassic or sodic hydrate as the exciting-fluid with any depolarizing agent; but

I claim as my invention—

A galvanic cell having an oxide of mercury as the depolarizing agent, and a solution of potassic or sodic hydrate as the exciting-fluid, substantially as set forth.

In testimony whereof I have signed my name to this specification in the presence of two subscribing witnesses.

CHAS. L. CLARKE.

Witnesses:
GEORGE DAVIES,
CHARLES DAVIES.